United States Patent
Couillard et al.

(10) Patent No.: US 6,517,671 B2
(45) Date of Patent: Feb. 11, 2003

(54) RAMPED ULTRASONIC BONDING ANVIL AND METHOD FOR INTERMITTENT BONDING

(75) Inventors: Jack Lee Couillard, Menasha, WI (US); Joseph Daniel Coenen, Kaukauna, WI (US); Kent William Abel, Black Creek, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 60 days.

(21) Appl. No.: 09/726,858

(22) Filed: Nov. 30, 2000

(65) Prior Publication Data

US 2002/0062901 A1 May 30, 2002

(51) Int. Cl.⁷ .............................................. B29C 65/08
(52) U.S. Cl. .................... 156/580.2; 156/553; 156/555; 156/582
(58) Field of Search ................................ 156/73.1, 290, 156/308.2, 308.4, 324, 553, 555, 580.1, 580.2, 582

(56) References Cited

U.S. PATENT DOCUMENTS

| | | | |
|---|---|---|---|
| 4,083,737 A | 4/1978 | Foote, Jr. et al. .......... 156/73.1 |
| 5,707,470 A | 1/1998 | Rajala et al. ............... 156/73.2 |
| 5,711,847 A | 1/1998 | Rajala et al. ............. 156/580.2 |
| 5,733,411 A | * 3/1998 | Bett ........................ 156/580.2 |
| 5,817,199 A | * 10/1998 | Brennecke et al. ......... 156/73.1 |
| 6,123,792 A | 9/2000 | Samida et al. ............. 156/73.1 |
| 6,149,755 A | * 11/2000 | McNichols et al. ......... 156/264 |
| 6,165,298 A | * 12/2000 | Samida et al. ............. 156/73.1 |
| 6,287,403 B1 | * 9/2001 | Couillard et al. .......... 156/73.1 |

\* cited by examiner

*Primary Examiner*—James Sells
(74) *Attorney, Agent, or Firm*—Wilhelm Law Service; Thomas D. Wilhelm

(57) ABSTRACT

Method and apparatus comprising a novel ramped anvil roll for cooperating with a rotary ultrasonic horn and creating ultrasonic bonds in a work piece passing between the anvil roll and ultrasonic horn. A relatively smaller radius portion of the anvil roll extends about a first portion of the circumference, and a relatively larger-radius raised bonding element extends about a second portion of the circumference. An outer surface at at least one of a front and rear end portion of the raised bonding element defines a transition gradient between the raised operating surface and the relatively smaller radius portion. The transition gradient defines a modified sinusoidally-shaped curved loading surface including an inflection locus, the curved loading surface representing a relatively constantly changing angle as measured against respective radii of the anvil roll in combination with advancing along the corresponding portion of the circumference.

36 Claims, 5 Drawing Sheets

RAMPED ULTRASONIC BONDING ANVIL AND METHOD FOR INTERMITTENT BONDING

BACKGROUND

The present invention relates to apparatus and methods for effecting ultrasonic bonding on at least one continuously moving web or work piece. The invention more particularly concerns apparatus and methods for ultrasonically bonding at least one continuously moving web using a rotary anvil roll in combination with a rotary ultrasonic horn.

It is known to bond at least one continuously moving substrate web by constrictively passing the web through a nip defined between a rotating ultrasonic horn and a rotating anvil roll. Typically, the anvil roll includes one or more arrays of raised projections configured to bond the web in a predetermined bond pattern. The rotary ultrasonic horn is capable of expressing ultrasonic energy at a bonding surface so as to ultrasonically bond the web as the web travels through the nip.

The consistency and quality of the bond when using such rotary bonding techniques is dependent on, among other parameters, the consistency of the force exerted on the web by the combination of the anvil roll and the ultrasonic horn; the time during which the web is under compression in the nip; the size, shape, depth, and percent bond area of a bond pattern, where the area of the bond projections as a percentage of the total surface area of the bonded region defines the percent bond area; and the properties of material or materials being bonded. The consistency and quality of the bonds are also dependent on the frequency and amplitude of the vibrations of the ultrasonic horn.

Consistency and quality of bonds when using conventional rotary ultrasonic bonding methods and apparatus has been particularly variable where the desired bond pattern is intermittent, especially where the force expressed at the nip changes significantly, and may drop to substantially zero, in concert with the intermittent nature of the intermittency of the bonding operation.

When using conventional methods for rotary bonding in such configuration, the bond quality has typically been less than satisfactory along the length of the bond pattern. According to the invention, such inconsistency in the bond pattern has been due, at least in part, to inconsistent levels of force being effectively applied along the lengths of the respective intermittent bond regions of the bond pattern. Typical of such inconsistency is relatively greater nip loading at the leading edge of the bond region, and relatively lesser nip loading behind the leading edge of the respective element as the bonding apparatus flexes or deflects in combination with the passing of the respective bonding region, typically a raised bonding element, through the nip. Both the relatively greater nip loading and the relatively lesser nip loading comprise undesired inefficiency of control of nip pressure at the respective loci, and can result in poor bond quality and poor bond consistency.

Under excessive loading, which may be encountered at the relatively greater loading levels, so much energy may be applied to the materials being bonded as to burn through or otherwise excessively soften the materials being bonded, as well as to apply excessive pressure to the softened materials, whereby bonds so formed may be weak, and/or the bonds after cooling may be uncomfortably harsh to the touch of a wearer's skin. In the alternative, excessive loading can physically damage, as by tearing, the material being bonded.

Additionally, excessive loading can result in increased rates of wear on the ultrasonic horn and/or anvil roll, or can damage the horn and/or anvil. Finally, ultrasonic horns are generally driven by piezoelectric crystals that convert electrical energy at high frequency into mechanical vibrations. When an excessive impulse load is applied to the horn, the mechanical process works in reverse to cause a resulting electrical spike which can overload and shut down the electrical frequency generator.

Generating ultrasonic bonds depends on the combination of frequency and amplitude of the vibrations, the amount of pressure applied at the nip, and the time during which pressure is applied. Under conditions of insufficient loading at the nip, too little pressure is applied to the materials to be softened thereby, whereby the amount of energy transferred to the elements to be bonded together is insufficient to develop sufficiently strong bonds.

The above-mentioned difficulties of maintaining desired bond quality and consistency along both the length and width of the web become even more acute when intermittently bonding at least one continuously moving web using a rotary ultrasonic horn. Operation of a rotary ultrasonic horn includes movement inherent in the continuous vibration of the horn at a given frequency and amplitude to efficiently bond the web, as well as rotation of the horn as the web passes between the horn and the anvil at the nip. The web may vary in thickness along the length of the web, thus to impose varying resistance to the nip pressure being applied by the combination of the horn and the anvil on the web. Under certain conditions, such vibratory motion of the horn, and variation of web thickness, either alone or in combination, may adversely affect bond consistency and quality in the web if suitable steps are not taken to account for such thickness variation.

In addition, where the web advancing through the nip, defined between the horn and the anvil, varies in thickness and/or density, the web may apply a correspondingly varying back pressure on the horn and anvil. Thus, the overall result of variation in nip pressure, can be defined in terms of, among other parameters, the combination of the degree of variability in manufacturing and mounting the horn and anvil, as well as the degree of variability in thickness of the web moving through the nip between the anvil and horn.

These difficulties are even further exacerbated when the rotary ultrasonic bonding includes an intermittent bond pattern as discussed above such that a discrete raised array of bonding projections is introduced into the nip at the initiation of bonding of each bond region.

It is an object of this invention to provide bonding apparatus and methods wherein nip pressure is more uniform along the lengths and widths of respective bonding regions.

It is a further object to provide a transition gradient on a respective anvil roll being shaped to facilitate vertical acceleration and vertical deceleration of a complimentary ultrasonic horn.

It is yet a further object to provide a loading surface on an anvil roll, which is shaped to preclude effective bonding interference between the anvil roll and a cooperating rotary ultrasonic horn.

SUMMARY

In a first family of embodiments, the invention comprehends a ramped anvil roll for cooperating with an ultrasonic horn and thereby creating ultrasonic bonds in a work piece passing between the anvil roll and a respective such ultrasonic horn. The ramped anvil roll has first and second sides of the anvil roll defining an anvil roll width therebetween, and the anvil roll further comprises a circumference thereabout. A relatively smaller radius portion of the anvil roll extends about a first portion of the circumference, and a relatively larger-radius raised bonding element extends about a second portion of the circumference. The raised bonding element has a front end portion, a rear end portion, a width defined by first and second sides thereof, and a raised operating surface defined between the first and second sides of the raised bonding element, and between the front end portion and the rear end portion. An outer surface at at least one of the front end portion and the rear end portion of the raised bonding element defines a transition gradient between the raised operating surface and the relatively smaller radius portion of the anvil roll. The transition gradient defines a modified sinusoidally-shaped curved loading surface including an inflection locus, the curved loading surface representing a relatively constantly changing angle as measured against respective radii of the anvil roll in combination with advancing along the corresponding portion of the circumference of the anvil roll.

The transition gradient can correspond with about 0.40 inch to about 0.60 inch of the circumference of the anvil, and preferably about 0.30 inch to about 0.70 inch of the circumference of the anvil.

The anvil roll can have a width of about 0.60 inch to about 6.00 inches, preferably about 1.25 inches to about 6.00 inches. Regardless of the desired width of a respective anvil roll, the width of a resultant bond pattern created using the anvil roll is less than or substantially equal to the width of the anvil roll.

One or both of the loading surface and the raised operating surface of the raised portion of the anvil roll can comprise an array of projections thereon spaced from each other and extending along the respective second portion of the circumference of the anvil roll, and across the entirety of the transverse width of the at least one raised portion, thereby covering substantially the respective entirety of one or both of the loading surface and the operating surface of the raised portion of the anvil roll.

Alternatively, one or both of the loading surface and the raised operating surface of the raised portion of the anvil roll can comprise an array of projections thereon, the projections being disposed in discrete spaced arrays which cover portions but not all of either or both of the respective circumference or width attributes of either or both of the loading surface and the operating surface of the raised portion of the anvil roll.

A pattern of projections about the loading surface and/or the raised operating surface of the raised portion of the anvil roll can generally define a resultant bond pattern wherein the resultant bond pattern represents about 20 percent to about 40 percent bond area and, correspondingly, about 80 percent to about 60 percent non-bond area.

In preferred embodiments, a resultant bond pattern from a first pattern of projections distributed about a portion or the entirety of the loading surface of the anvil roll represents the same or less percentage bonded area as a second pattern of projections distributed about a portion or the entirety of the raised operating surface of the anvil roll.

The second radius can be about 0.002 inch to about 0.07 inch greater than the first radius, and preferably about 0.01 inch to about 0.05 inch greater than the first radius.

In preferred embodiments, the loading surface of a given transition gradient is shaped to facilitate both vertical acceleration and vertical deceleration, of such ultrasonic horn as the horn moves from the smaller radius portion to the raised operating surface, or from the raised operating surface to the smaller radius portion.

The transition gradient can be disposed at the front end portion of the raised bonding element of the anvil roll; optionally at both the front end portion and the rear end portion of the raised bonding element.

The loading surface of the transition gradient can generally comprise a leading edge and a trailing edge. The leading edge of the transition gradient is typically defined at a radius at least as great as the first radius and less than the second radius. The trailing edge of the transition gradient is typically defined at the second radius and corresponds with the leading edge of the raised operating surface. The inflection locus is generally defined between the leading and trailing edges. The loading surface can be shaped to preclude effective bonding interference between the rotary anvil roll and a cooperating rotary ultrasonic horn, for bonding an absorbent article substrate, between the inflection locus and the leading edge of the raised operating surface.

In some embodiments, the trailing edge is generally defined at a radius at least as great as the first radius and less than the second radius, the leading edge being defined at the second radius and corresponding with the trailing edge of the loading surface, the inflection locus being disposed between the leading and trailing edges of the loading surface, the loading surface being shaped to preclude effective bonding interference between the rotary anvil roll and a cooperating rotary ultrasonic horn, for bonding an absorbent article substrate, between the inflection locus and the trailing edge of the raised operating surface.

In a second family of embodiments, the invention comprehends ultrasonic bonding apparatus for intermittently creating ultrasonic bonds in sequentially advancing absorbent article work piece segments, in a nip, wherein the work piece segments are up to about 0.25 inch thick at respective bonding loci. The ultrasonic bonding apparatus comprises a ramped anvil roll mounted for rotation about a first axis, and a rotary ultrasonic horn mounted for rotation about a second axis, generally aligned with the first axis. First and second sides of the anvil roll define an anvil roll width therebetween, the anvil roll further comprising a circumference thereabout. A relatively smaller radius portion of the anvil roll extends about a first portion of the circumference, and a relatively larger-radius raised bonding element extends about a second portion of the circumference. The raised bonding element has a front end portion, a rear end portion, a width defined by first and second sides thereof, and a raised operating surface defined between the first and second sides of the raised bonding element, and between the front end portion and the rear end portion. An outer surface at at least one of the front end portion and the rear end portion of the raised bonding element defines a transition gradient between the raised operating surface and the relatively smaller radius portion of the anvil roll. The transition gradient defines a modified sinusoidally-shaped curved loading surface including an inflection locus, the curved loading surface representing a relatively constantly changing angle as measured against respective radii of the anvil roll in combination with advancing along the corresponding portion of the circumference of the anvil roll. The horn comprises a radius, a circumference, a width, and a bonding surface. The ultrasonic horn and the anvil roll, in combination, are mounted and configured such that the ultrasonic horn and the anvil roll can be brought together to define a nip therebetween, wherein the anvil roll and the ultrasonic horn can rotate in common with movement of absorbent article work piece elements passing through the nip, and corresponding intermittent passage of the raised bonding element through the nip, accompanied by intermittent bonding of such work piece elements. The horn and the anvil roll define sufficient nip pressure to develop ultrasonic bonds in absorbent article substrate material of the work piece segments passing through the nip.

The anvil roll and the horn can be mounted and configured such that, when the raised portion of the anvil roll passes into and through the nip, the presence of the raised portion in the nip, in combination with any interference between the raised portion of the anvil roll and the horn, imposes stress on both the horn and the anvil roll, thus providing suitable force at the nip to develop ultrasonic bonds in absorbent article substrate material passing through the nip, using ultrasonic energy being expressed by the horn.

The anvil roll and the horn can be mounted and configured such that, when the raised portion of the anvil roll is not disposed in the nip, the smaller radius portion of the anvil roll is disposed in the nip, and the nip force is substantially less than a force required to form ultrasonic bonds at the nip.

In some embodiments, the anvil roll and the horn can be mounted and configured such that, when the raised portion of the anvil roll is not disposed in the nip, the smaller radius portion of the anvil roll is disposed in the nip, and the nip force is at least a minimum force required to form ultrasonic bonds at the nip, in suitable absorbent article work pieces.

In a third family of embodiments, the invention comprehends a ramped anvil roll for cooperating with an ultrasonic horn and thereby creating ultrasonic bonds in a work piece passing between the anvil roll and a respective such ultrasonic horn. First and second sides of the anvil roll define an anvil roll width therebetween, the anvil roll further comprising a circumference thereabout. A relatively smaller radius portion of the anvil roll extends about a first portion of the circumference, and a relatively larger-radius raised bonding element extends about a second portion of the circumference. The raised bonding element has a front end portion, a rear end portion, a width defined by first and second sides thereof, and a raised operating surface defined between the first and second sides of the raised bonding element, and between the front end portion and the rear end portion. An outer surface at at least one of the front end portion and the rear end portion of the raised bonding element defines a transition gradient between the raised operating surface and the relatively smaller radius portion of the anvil roll. The transition gradient defines a modified sinusoidally-shaped curved loading surface including an inflection locus, the curved loading surface being configured such that vertical velocity of such ultrasonic horn at a portion of the transition gradient juxtaposed adjacent the raised operating surface is substantially zero under conditions wherein target nip pressure between the anvil roll and such rotary ultrasonic horn at the raised operating surface is effective to develop ultrasonic bonds in an absorbent article substrate.

The ramped ultrasonic anvil roll can further comprise a surface defined between the first and second sides of the anvil roll, and around the relatively smaller radius portion of the anvil roll, wherein at least a portion of the surface of the anvil roll comprises an array of bonding projections thereon spaced from each other and extending along at least a portion of the relatively smaller radius portion of the circumference of the anvil roll, and across at least a portion of the transverse width of the anvil roll.

In a fourth family of embodiments, the invention comprehends a method of creating ultrasonic bonds in sequentially advancing absorbent article substrate work piece segments, wherein the work piece segments to be bonded are up to about 0.25 inch thick. The method comprises passing the work piece segments through a nip defined by an ultrasonic horn, and an anvil roll mounted for rotation about a first axis, the anvil roll comprising a width and a circumference. The anvil roll further comprises a first relatively smaller radius portion extending about a first portion of a circumference of the anvil roll and at least one raised bonding element having a second relatively larger radius extending about a second portion of the circumference of the anvil roll, and a rotary ultrasonic horn mounted for rotation about a second axis, aligned with the first axis. The method also comprises bringing the ultrasonic horn and the anvil roll together in defining the nip with interference at the raised bonding element, and correspondingly developing suitable pressure in the nip to create ultrasonic bonds in the absorbent article work pieces. The method further comprises activating ultrasonic energy in the ultrasonic bonding horn. Additionally, the method includes rotating the ultrasonic horn and anvil roll in common with movement of the work piece segments through the nip, and thereby intermittently applying pressure to the work piece segments at the raised bonding element, and creating ultrasonic bonds in the work piece segments passing through the nip.

The raised bonding element further comprises an operating surface represented by an area defined by the width of the raised bonding element and the second portion of the circumference of the anvil roll.

The anvil roll preferably comprises a transition gradient between the first portion of the circumference of the anvil roll and the raised bonding element, the transition gradient comprising a modified sinusoidal curve including an inflection locus. The transition gradient generally defines a series of potentially continuously changing radii along a portion of the circumference of the anvil roll, product of the transition gradient and width of the raised bonding element defining a loading surface of the transition gradient.

The rotary ultrasonic horn comprises a radius, a circumference, a width, and a bonding surface, The loading surface and the operating surface of the raised bonding element of the anvil roll optionally can comprise an array of bonding projections thereon, the projections being disposed in discrete spaced arrays which cover all of the circumference and width, or portions but not all of either or both of the circumference or width, of the loading surface and the operating surface of the raised bonding element of the anvil roll.

A pattern of bonding projections about the loading surface and operating surface of the raised bonding element of the anvil roll generally controls a longitudinal arrangement of a resultant bond pattern.

In some embodiments, the raised bonding element of the anvil roll, including a first larger radius portion of the anvil roll, can provide bonding activity at thinner sections of a web of material, and the second relatively smaller radius portion of the anvil roll can provide clearance between the anvil roll and the horn for passage of relatively thicker sections of the web between the anvil roll and the horn.

In some embodiments, when the raised bonding element of the anvil roll passes into and through the nip, the presence of the raised bonding element in combination with interference between the raised bonding element of the anvil roll, and the horn, imposes stress on both the horn and the anvil roll, thus providing suitable force at the nip to develop ultrasonic bonds using ultrasonic energy being expressed by the horn.

In some embodiments, when the raised bonding element of the anvil roll is not disposed in the nip, and the smaller radius portion of the anvil roll is disposed in the nip, the nip force is substantially less than the force required to form ultrasonic bonds.

Figure 1:
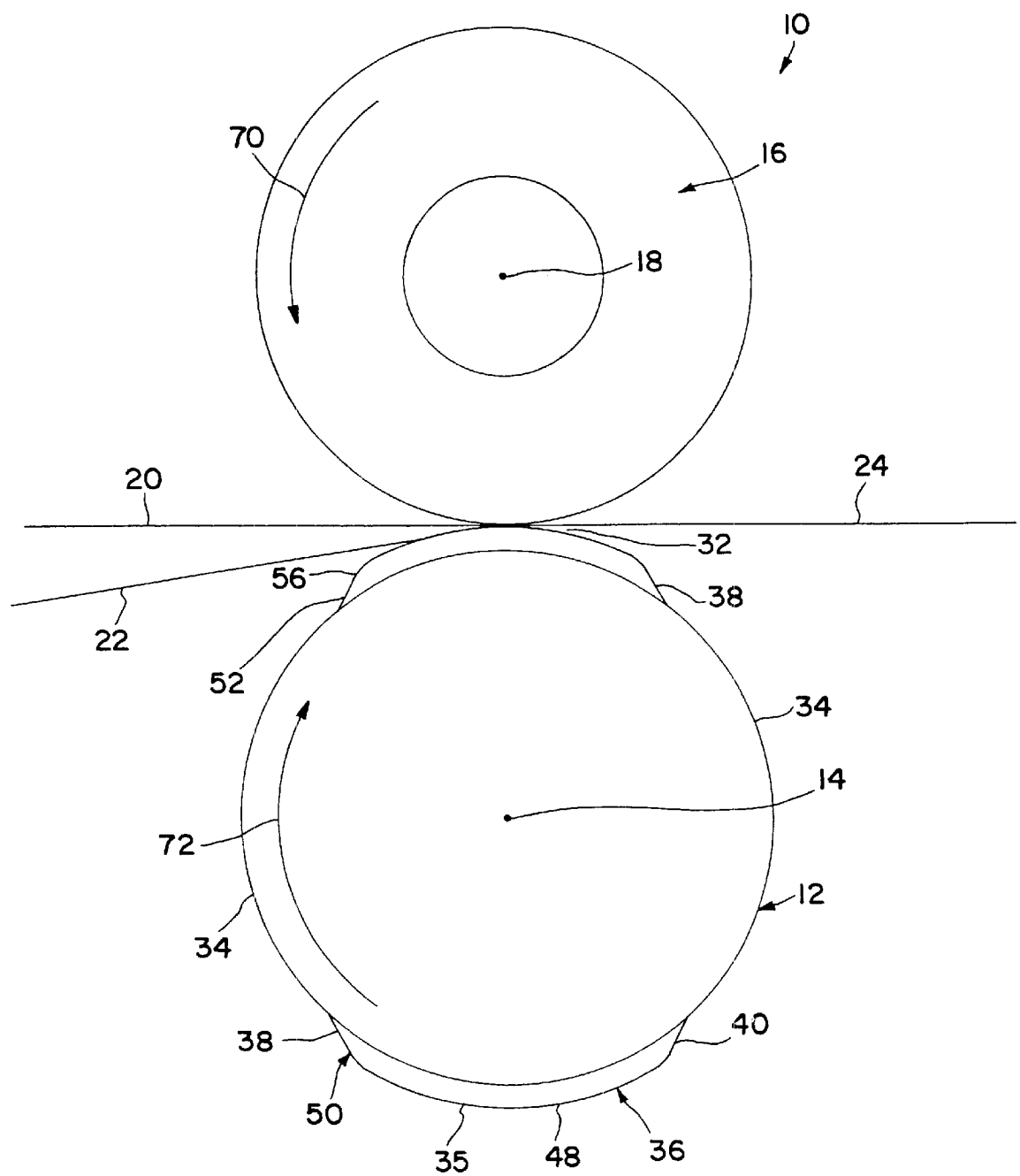
FIG. 1 shows a representative side elevation view of apparatus of the invention defining a bonding nip which can be used in bonding processes employing the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

As representatively illustrated in FIG. 1, ultrasonic bonding apparatus 10 comprises a ramped anvil roll 12 and a rotary ultrasonic horn 16. Anvil roll 12 is configured to rotate about anvil axis 14 in the direction of arrow 72, and similarly, ultrasonic horn 16 is configured to rotate about horn axis 18 in the direction of arrow 70. The anvil roll is configured to press substrate web 20, optionally along with a second element or web 22 to be bonded thereto, against ultrasonic horn 16 at nip 32, defined between the anvil roll and the horn, thereby forming a composite element or web 24.

A relatively smaller radius portion 34 of anvil roll 12 extends about a first portion of the circumference, and a relatively larger-radius portion 35 of the circumference at raised bonding element 36, having an operating surface 48, extends about a second portion of the circumference. Anvil roll 12 can have any desired number of raised bonding elements. Anvil roll 12 in FIG. 1 includes two bonding elements 36. A raised bonding element 36 generally has a front end portion 38 and a rear end portion 40. In some embodiments, the only difference between front end portion 38 and rear end portion 40 is orientation with respect to direction of rotation 72 and contact relationship with horn 16. At one or both of the front end portion and the rear end portion of a given raised bonding element 36, a transition gradient 50 is defined between the raised bonding element and relatively smaller radius portion 34 of anvil roll 12. Transition gradient 50 defines a modified sinusoidally-shaped curved surface including an inflection locus 52.

As suggested by FIG. 1, transition gradient 50 generally represents a relatively constantly changing angle along a straight line extending across the width of the transition gradient and as measured against respective radii of the anvil roll in combination with advancing along the corresponding portion of the circumference of the anvil roll. The curved surface of the transition gradient is preferably configured such that vertical velocity of ultrasonic horn 16 at a portion of transition gradient 50 juxtaposed adjacent operating surface 48 is substantially zero under conditions wherein target nip pressure between anvil roll 12 and rotary ultrasonic horn 16 at raised operating surface 48 is effective to develop ultrasonic bonds in an absorbent article substrate which is being processed by the bonding apparatus.

Figure 2:
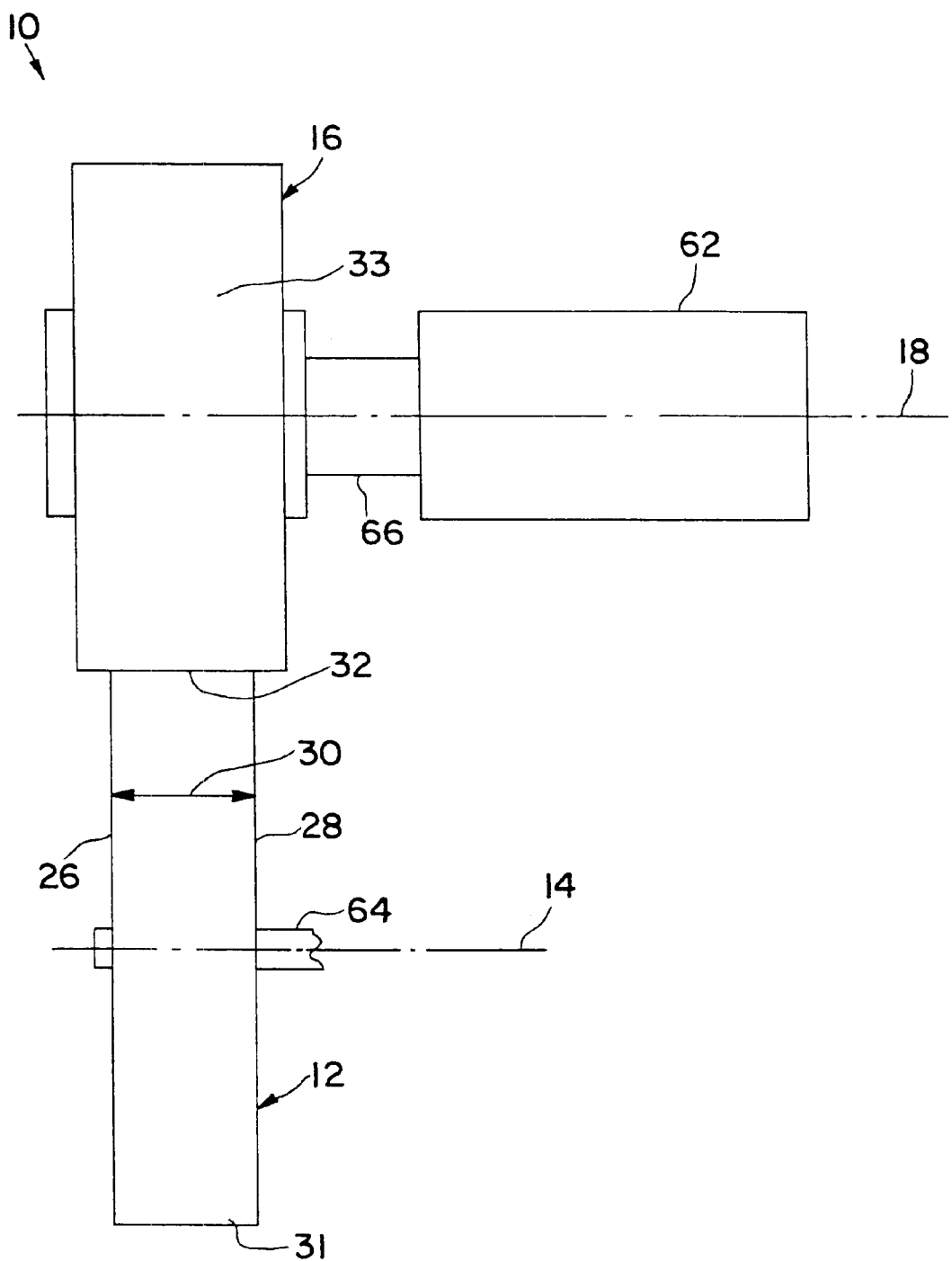
FIG. 2 shows a representative front elevation view of a bonding nip, e.g. the nip of such as can be used in bonding processes employing the invention.

Referring to FIG. 2, anvil roll 12 is connected to a shaft 64 which is rotatably mounted about axis of rotation 14 and connected to an anvil support apparatus (not shown). Surface 31 of anvil roll 12 is circumferentially defined between first side 26 and second side 28 of anvil roll 12, thus defining a width 30 of anvil roll 12.

In general, anvil roll 12 can be made from any metal having suitable mechanical properties for tolerating the use environment, and the function of urging the materials to be bonded into bonding engagement with surface 33 of ultrasonic horn 16. Suitable metals include, for example and without limitation, certain of the alloy steels.

Ultrasonic horn 16 is connected to a shaft 66 which, in turn, is connected to a horn drive mechanism 62 which rotates horn 16 about axis of rotation 18 and ultrasonically excites horn 16. Drive mechanism 62 can include piezoelectric crystals, an amplifier, and part or all of a wave guide. Any mechanism which provides the desired rotation and ultrasonic excitation can be used in the present invention. Such mechanisms are well known to those skilled in the art.

For example, drive mechanism 62 can be a mechanism commercially available from Dukane Corporation, St. Charles, Ill. or a similar system available from Brenson Sonic Power Company, Danbury, Conn. Namely, a generator such as a Dukane 1800 watt, 20 kHz generator (Part No. 20A1800), is connected to a drive assembly, such as a Dukane drive assembly (Part No. 110-3123), to provide the necessary ultrasonic excitation. Any combination of boosters, such as a Dukane 1:1 booster (Part No. 2177T) and a Dukane 2:1 booster (Part No. 2181T), may then be attached to the drive assembly. Finally, rotary ultrasonic horn 16 of the present invention is mechanically and ultrasonically attached to the boosters. Thus, the combination of generator, drive assembly, and boosters, functioning as drive mechanism 62, rotates and ultrasonically excites rotary ultrasonic horn 16 thereby providing the ultrasonic energy and rotational motion necessary to form bonds in substrate web 20, or to bond elements or substrate web 22 and web 20 to each other under suitable nip forces.

In general, conventional ultrasonic excitation crystals (piezoelectric crystals) are operationally connected to horn 16 through suitable amplifier and wave guide structure, so as to implement radially-directed ultrasonic vibrations in annular horn 16. Rotary horn 16 is generally disc-shaped although the precise outer configuration of the horn varies considerably from horn to horn in accord with other horn variables.

Horn 16 generally comprises a shaped metal object. Representative examples of rotary ultrasonic horns which can be used in the present invention are described in U.S. Pat. No. 5,096,532 to Neuwirth et al and U.S. Pat. No. 5,110,403 to Ehlert, both of which are herein incorporated by reference in their entireties. In general, rotary ultrasonic horn 16 can be made from any metal having suitable acoustical and mechanical properties. Suitable metals include aluminum, monel, titanium, and some alloy steels. Titanium is preferred for its overall combination of desirable properties. In general, variables such as diameter, mass, width, thickness, and configuration of the rotary ultrasonic horn can be varied within substantial ranges. However, such variables, along with composition of the horn, do determine the particular frequency and amplitude at which a particular rotary ultrasonic horn resonates, which can affect bond quality and consistency. In particular, diameter, width, and thickness of the horn are selected such that the horn, upon being excited by ultrasonic energy at a desired frequency, is adapted to resonate such that the excited end moves substantially in phase with movement of the excitation source, and the bonding surface 33 also moves in a suitable pattern which is directed generally perpendicular to annular bonding surface 33 of the horn.

Figure 3:
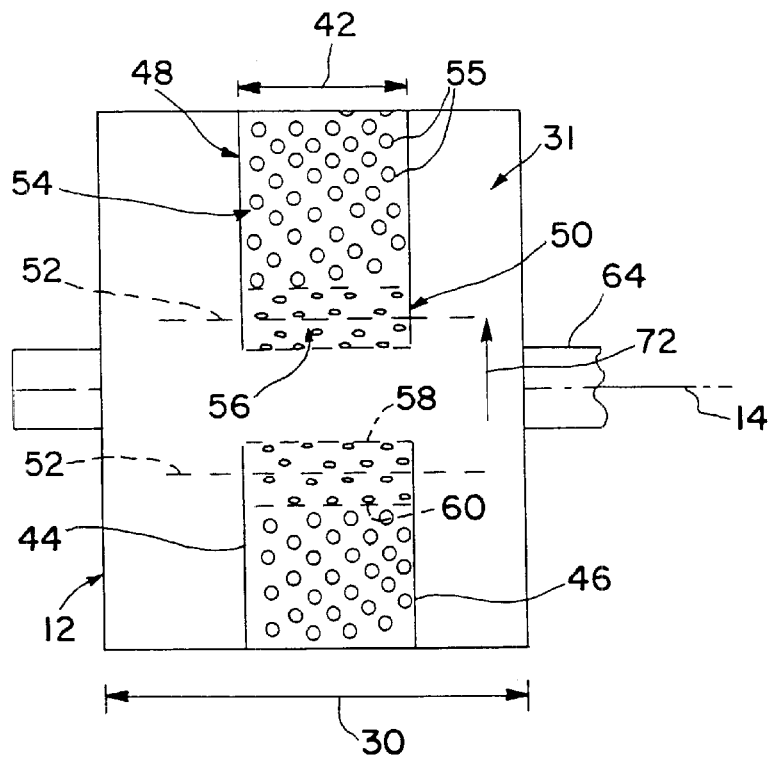
FIG. 3 shows a representative top view of an anvil roll useful in the invention, including first and second bonding regions and corresponding transition gradients.
Figure 3A:
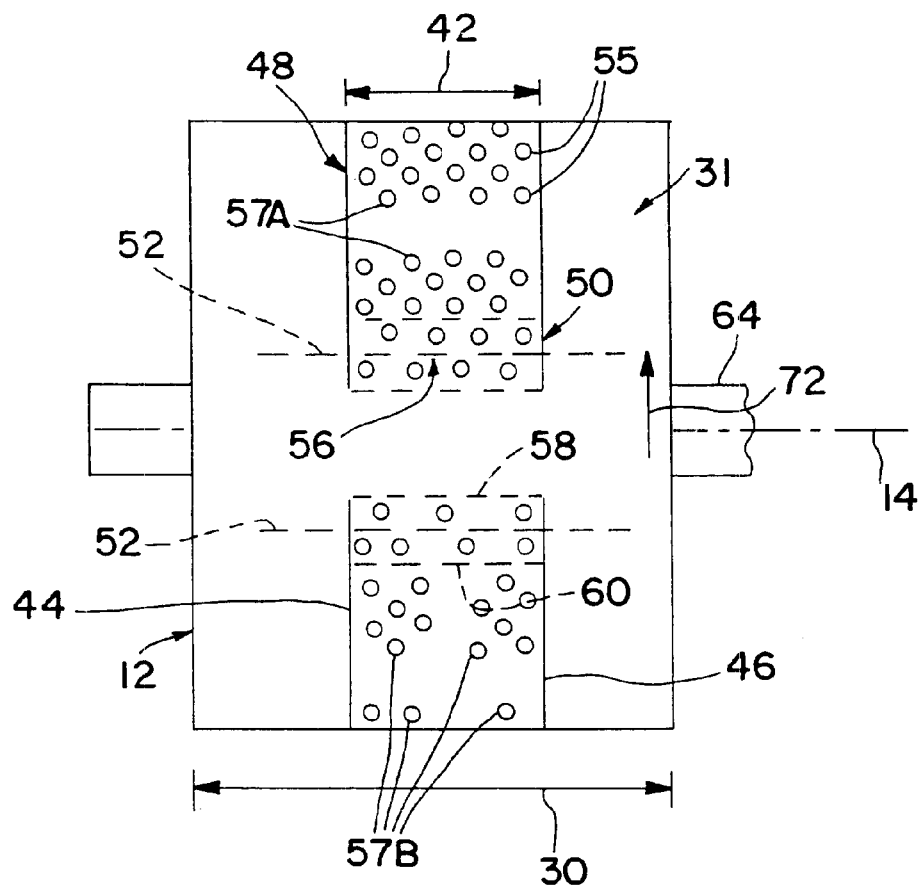
FIG. 3A shows a representative top view of an anvil roll illustrating multiple arrays of projections on the loading surface and the operating surface of raised bonding elements.

Referring to FIG. 3, typically, anvil roll 12, mounted about shaft 64, has a width 30 of about 0.60 inch to about 6.00 inches, desirably from about 1.25 inches to about 6.00 inches. Width 42 of raised operating surface 48 is shown as less than width 30, but may be any width up to the full extent of width 30. Operating surface 48 is configured to bond substrate webs 20, 22 (FIG. 1), or a substrate web 20 and discrete elements to each other, or to form bonds internally in web 20, at bond locations arranged in a predetermined bond pattern on operating surface 48 as anvil roll 12 rotates about axis 14 and cooperatively interacts with the respective ultrasonic horn. For example, as representatively illustrated in FIG. 3, operating surface 48 of anvil roll 12 can have an array 54 of projections 55 thereon. In the alternative, as illustrated in FIG. 3A, longitudinally spaced multiple arrays 57A of projections can be employed on operating surface 48. Further, transversely spaced arrays 57B of projections can be employed on a given operating surface 48. Arrays 57B are shown as both transversely and longitudinally spaced from each other. It will be understood that arrays 57B can be only transversely spaced on a given operating surface 48.

Raised operating surface 48 is defined between first side 44 and second side 46 of the raised bonding element, and between front end portion 38 and rear end portion 40. An outer surface at at least one of the front end portion and the rear end portion of the raised bonding element defines a transition gradient 50 between raised operating surface 48 and relatively smaller radius portion 34 of the anvil roll. Transition gradient 50 is configured as a modified sinusoidally-shaped curved surface including an inflection at inflection locus 52.

Referring to FIGS. 1 and 3, transition gradient 50 defines a loading surface 56 which extends between relatively smaller radius portion 34 of the anvil roll and raised operating surface 48 at relatively larger radius portion 35. The loading surface of the transition gradient is shaped to facilitate vertical acceleration and vertical deceleration of a respective ultrasonic horn being used in combination with the anvil roll.

Referring to FIG. 3, loading surface 56 of the transition gradient comprises a leading edge 58 and a trailing edge 60, given rotation of anvil roll 12 in the direction indicated by arrow 72 in FIG. 3. In some implementations, leading edge 58 is defined at a radius at least as great as the first radius and less than the second radius, the trailing edge being generally defined at the second radius and generally corresponding with the leading edge of the raised operating surface. In other implementations, trailing edge 60, of the loading surface which is located at the trailing edge of the operating surface, is defined at a radius at least as great as the first radius and less than the second radius, the leading edge being defined generally at the second radius and generally corresponding with the trailing edge of the raised operating surface. In the above-mentioned implementations, inflection locus 52 is disposed between the leading and trailing edges.

In general, the curve defined between inflection locus 52 and the lesser radius portion of the anvil roll is defined about one or more centers located outwardly of anvil roll 12; and the curve defined between inflection locus 52 and the greater radius portion of the anvil roll is defined about one or more centers located inwardly toward the interior of anvil roll 12.

In some embodiments, array 54 or arrays 57A, 57B of projections 55 on raised operating surface 48 can extend along the entirety of the circumferential length of the respective raised operating surface 48, and across the entirety of the transverse width of raised operating surface 48, thereby to cover substantially the entirety of the raised operating surface, as well as loading surface 56, of the anvil roll. In other embodiments, projections 55 can be disposed, as shown in FIG. 3A, in discrete spaced arrays which cover portions but not all of either or both of the length or width of one or both of the raised operating surface and raised loading surfaces of anvil roll 12.

In preferred embodiments, loading surface(s) 56 of anvil roll 12 comprises projections 55. If projections 55 are not disposed on the loading surface(s), the nip force is distributed over the entirety of the operating surface which is in the nip, rather than focusing such force on a smaller fraction of the operating surface. Correspondingly, the nip pressure at a given force loading, or interference level, is less than the nip pressure which could be obtained using spaced projections. Accordingly, application of an interference level effective to cause bonding in an array of projections may result in the loading surface(s), which lacks projections, riding on top of the webs being nipped and not developing bonds rather than extending inwardly of the surface of the web, as at projections 55, and thereby creating bonds. Accordingly, where a loading surface 56 is used without projections 55, the level of nip force, and thus interference, required to develop ultrasonic bonds at the loading surface is greater than the nip force/interference required to develop ultrasonic bonds where the respective surface does include projections 55.

In some embodiments, at least a portion of surface 31 defined between the first side 26 and second side 28 of anvil roll 12, and around the relatively smaller radius portion of the circumference of the anvil roll, comprises one or more arrays of bonding projections thereon extending along at least a portion of the relatively smaller radius portion of the circumference of the anvil roll, and across at least a portion of the transverse width of the anvil roll.

Employing multiple arrays of projections, whether partial or full width arrays, with longitudinally-spaced breaks between such arrays, can result in bonds being developed over less than the entirety of the area of the material passing through the nip. Namely, the extent to which bonds are developed in nip 32, across the width of the web, and along the length of the web, depends on the degree to which the array of projections 55 or other bonding elements extend across the width and along the length of the web. The pattern of projections about the circumference of the anvil generally controls the longitudinal arrangement of the bond pattern which can potentially be developed on materials passing through the nip.

Projections 55 can be any size or shape, any orientation or distribution, known to be effective for developing ultrasonic bonds, depending on the bond pattern desired for the material passing through the nip. A preferred, but not limiting, bond pattern is represented by about 20 percent to about 40 percent bond area and about 60 percent to about 80 percent non-bond area, more preferably about 30 percent bond area to about 70 percent non-bond area.

Figure 4:
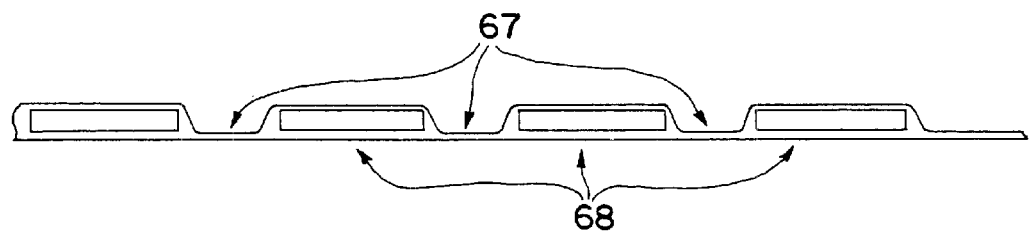
FIG. 4 shows a representative side elevation view of a composite substrate web which can be bonded using apparatus and methods of the present invention.

Raised bonding element 36 is particularly useful when one of substrate web 20, the combination of substrate webs 20, 22, or web 20 (FIG. 1) and discrete elements to be bonded thereto, have varying thicknesses as illustrated in FIG. 4. The principle of raised bonding element 36 is to provide a first larger radius portion of the anvil roll at 36 for providing bonding activity at thinner sections 67 of the material or materials being bonded. The relatively smaller radius portion of the anvil roll can provide clearance between the anvil roll and the horn for passage of thicker sections 68 of the web between the anvil roll and the horn.

In some embodiments, rotation of the anvil roll can be timed such that raised bonding element 36 of anvil roll surface 31 presses thinner sections 67 (FIG. 4) of substrate webs 20, 22 (FIG. 1) against bonding surface 33 of horn 16 with sufficient force to develop ultrasonic bonds at thinner sections 67 while thicker sections 68 of the web pass through the nip at the smaller radius portions 34 of the anvil roll without formation of bonds at the thicker portions.

In other embodiments, where an overall pattern is used, and continuous bonding force is desired between anvil roll 12 and horn 16, rotation of the anvil roll can be timed such that raised bonding element 36 of anvil roll surface 31 presses thinner sections 67 (FIG. 4) of substrate webs 20, 22 (FIG. 1) against bonding surface 33 of horn 16 with sufficient force to develop ultrasonic bonds at thinner sections 67, and similarly, smaller radius portions 34 of the anvil roll press some or all portions of thicker sections 68 (FIG. 4) of the web against bonding surface 33 of horn 16 with sufficient force to develop ultrasonic bonds at thicker sections 68.

Such timing of activation of the ultrasonic bonding, in accord with the lesser radius and greater radius sections of the anvil roll, can be beneficial to establishing and maintaining desirable levels of interference between bonding surface 33 and operating surface 48 of the anvil roll at the raised bonding elements, while enabling the thicker sections of the web or other work piece elements to pass through the nip without being crushed.

In preferred embodiments, when raised bonding element 36 passes into and through nip 32, the presence of the raised bonding element in combination with the planned interference between the raised bonding element and the horn, if any, imposes a relatively increased level of stress on both the horn and the anvil in order to provide suitable force at the nip to develop ultrasonic bonds using the ultrasonic energy being expressed in horn 16. Correspondingly, when raised bonding element 36 is not in the nip, namely when a smaller radius portion 34 is in the nip, the nip force, if any, is, in preferred embodiments, substantially less than that required to form ultrasonic bonds.

In some embodiments, there need be no interference between raised operating surface 48 of anvil roll 12 and bonding surface 33 of ultrasonic horn 16, so long as two criteria are met: first, a work piece such as substrate web 20, the combination of substrate webs 20, 22, or web 20 and discrete elements of varying thicknesses to be bonded thereto, is sufficiently thick to substantially resist compression forces; and second, mounting structure and support structure of bonding apparatus 10 is sufficiently rigid to develop bonding pressure as a result of the substantially compression-resistant work piece traveling through the nip. Thus, a composite nip interference, sufficient to create ultrasonic bonds in the work piece, is created by combined interaction between the raised surface of the anvil roll, the bonding surface of the ultrasonic horn, and the thickness of the substantially compression-resistant workplace material traveling through the nip.

The compositions of one or more of substrate webs 20, 22, and 24, including absorbent article substrates, can be any materials known to those skilled in the art which are compatible with development of ultrasonic bonds. For example, substrate webs 20, 22 can include one or more nonwoven materials such as spunbond, melt blown, spun laced or carded polymeric materials, a film material such as a polyolefin, for example polyethylenes and/or polypropylenes, or a polyurethane film, a foam material, or combinations of the above recited materials. One or both webs 20 and 22 may, themselves, be composites, in whole or in part, of the materials mentioned above. Thus the bonding techniques of the invention are not limited to bonding only 2 webs. Rather, webs 20 and 22 are representative of any combination of webs and/or workpiece elements which can be combined to develop web-like draw properties and transport properties.

For purposes of the present description, "nonwoven web" means a fibrous web of material which is formed of fibers without aid of a textile weaving or knitting process. Substrate webs 20, 22 may be elastic or non-elastic such as films or layers of natural rubber, synthetic rubber or thermoplastic elastomeric polymers.

Typical webs, web, or work piece combinations bonded using the invention have thicknesses of about 0.0005 inch to about 0.25 inch at bonding loci, and may have greater or lesser thicknesses at loci of the web which are not being so bonded.

As used herein, the terms "elastomeric" or "elastic" refer to any material which can be elongated or stretched in a specified direction from about 20 percent to at least about 400 percent by application of a biasing force and which recovers to within about 35 percent of its original length after being subsequently released from the biasing force after a short-term duration of the stretched condition.

Substrate webs 20, 22 can be made from the same material or can be made from different materials. In some embodiments, at least one of the substrate webs is made from resiliently stretchable material such as stretch-bonded-laminate (SBL) material, neck-bonded laminate (NBL) material, elastomeric film, elastomeric foam, or like resiliently stretchable materials as are well known to those skilled in the art.

The bonding resulting from application of ultrasonic energy can result from partial or complete melting of materials in one or both of substrate webs 24 or 34, or partial or complete melting of material in a corresponding element being applied to a respective substrate web. Bonding can result from partial or complete melting of material of only one of the elements being acted upon, with the activated material interacting with the corresponding adjacent substrate web or element which in turn results in mechanical interlocking of the elements/webs to each other.

In the alternative, bonding can result in mutual partial or complete melting of materials of both the elements being acted upon, with flow and/or other interaction between or among the respective materials of both elements which results in a bonding better represented as adhesive bonding or cohesive bonding, optionally in combination with the above-recited mechanical interlocking of components of one or both of the respective elements to each other.

In the embodiment illustrated in FIG. 1, portions of continuously moving substrate webs 20, 22 are one or both softened and melted using ultrasonic energy supplied to the rotary ultrasonic horn, along with sufficient pressure to activate the materials in the respective substrate webs, whereby the webs are thus bonded to each other through simultaneous application of ultrasonic energy and pressure. In such configuration illustrated in FIG. 1, anvil roll 12 is configured to rotate about anvil axis 14 and to press substrate webs 20, 22 against the outer peripheral bonding surface of ultrasonic horn 16 e.g. at raised bonding element 36 thereby bonding the substrate webs to each other forming bonded composite 24.

Figure 5A:
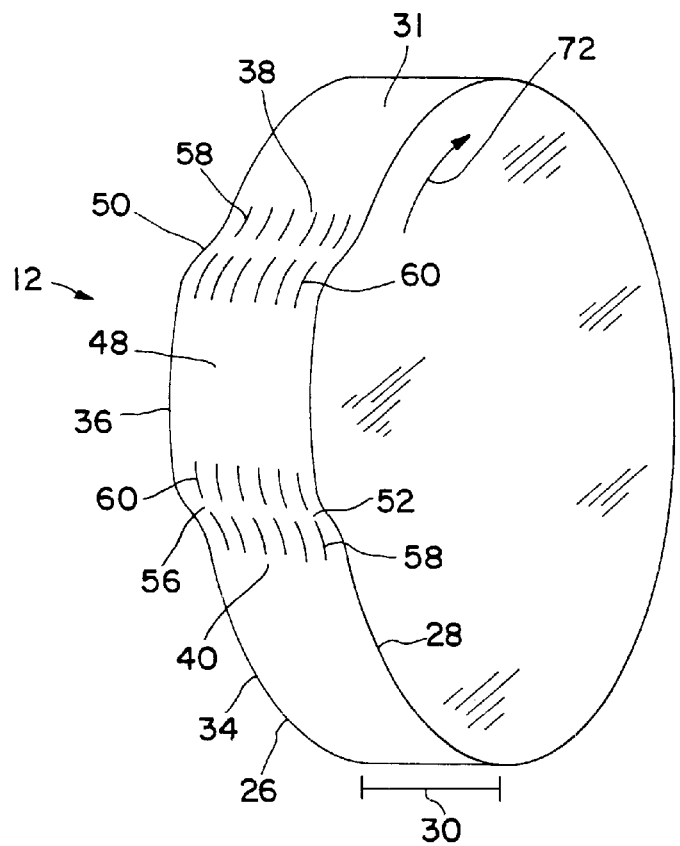
FIG. 5A shows a pictorial view of a first ramped anvil roll of the invention.
Figure 5B:
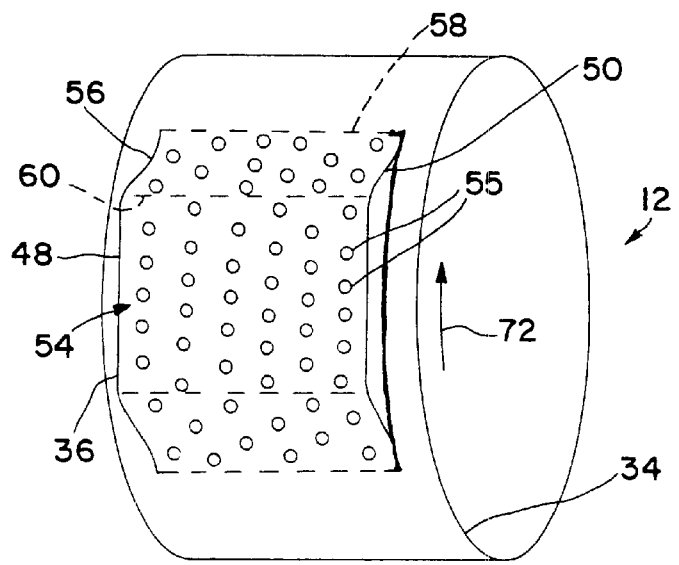
FIG. 5B shows a pictorial view of a second ramped anvil roll of the invention.

Referring to FIGS. 5A and 5B, exemplary ramped anvil roll 12 of FIG. 5A has a first side 26 and a second side 28 defining an anvil roll width 30 therebetween of about 0.60 inch to about 6.00 inches, and preferably about 1.25 inches to about 6.00 inches. Ramped anvil roll 12 further comprises a circumference thereabout. A relatively smaller radius portion 34 extends about a first portion of the circumference, and a relatively larger-radius raised bonding element 36 extends about a second portion of the circumference.

Raised bonding element 36 has a raised operating surface 48 defined between first and second sides of the ramped anvil roll, and between a front end portion 38 and a rear end portion 40. An outer surface at at least one of the front end portion and the rear end portion of the raised bonding element defines a transition gradient 50 between the raised operating surface and the relatively smaller radius portion of the anvil roll. The transition gradient defines a modified sinusoidally-shaped curved surface including an inflection locus 52, the curved surface representing a relatively constantly changing angle as measured against respective radii of the anvil roll in combination with advancing along the corresponding portion of the circumference of the anvil roll. In some embodiments, the transition gradient can correspond with about 0.40 inch to about 0.60 inch of the circumference of the anvil, and preferably about 0.30 inch to about 0.70 inch of the circumference of the anvil.

As illustrated in FIG. 5B, raised operating surface 48 of the anvil roll can comprise an array 54 of projections 55 thereon wherein the projections are preferably spaced from each other and extend along the respective direction of the circumference of the anvil roll, and across preferably the entirety of the transverse width of the at least one raised bonding element, thereby covering substantially the entirety of the operating surface of the raised bonding element of the anvil roll; or the projections can be disposed in discrete spaced arrays which cover portions but not all of either or both of the circumference or width attributes of raised operating surface 48. The pattern of projections on the operating surface and/or the loading surface generally defines the resultant bond pattern, which preferably represents about 20 percent to about 40 percent bond area and about 80 percent to about 60 percent non-bond area.

In both embodiments illustrated in FIGS. 5A and 5B, the second radius can be about 0.002 inch to about 0.07 inch greater than the first radius, and preferably about 0.01 inch to about 0.05 inch greater than the first radius.

In some embodiments, at least part of the lesser radius portion of the surface of the anvil roll comprises an array of bonding projections thereon spaced from each other and extending along at least a portion of the circumference of the anvil roll, and across at least a portion of the transverse width of the anvil roll.

Transition gradient 50 defines a loading surface 56 between relatively smaller radius portion 34 and raised operating surface 48, loading surface 56 being shaped to facilitate vertical acceleration and vertical deceleration of a respective ultrasonic horn working in combination with ramped anvil roll 12. The transition gradient can be disposed at front end portion 38 of the raised bonding element of the anvil roll, and a second such transition gradient 50 can optionally be disposed at rear end portion 40 of the raised bonding element.

Loading surface 56 comprises a leading edge 58 and a trailing edge 60, inflection locus 52 being disposed between the leading and trailing edges. The loading surface can be shaped to preclude effective bonding interference between ramped anvil roll 12 and a cooperating rotary ultrasonic horn, between inflection locus 52 and one or both of leading edge 58 or trailing edge 60 of the raised operating surface.

Shape and circumferential length occupied by loading surface 56 of transition gradient 50 depends on level and variation of a variety of factors including, but not limited to, nip pressure, bonding element height, and line speed, to balance dynamics of line operation against vertical inertia of the horn/anvil combination when the rotational travel of the horn causes the horn to meet the loading surface of the anvil roll. For example, if a web is being drawn along the operations path through the nips defined between the rotary anvils and respective ones of the ultrasonic horns at a speed of 900 feet per minute, the transition gradient of the anvil roll will not need to occupy as much circumferential length or have as gradual a slope as a similar bonding apparatus running at a speed of 1300 feet per minute. Similarly, the greater the difference in height between the smaller radius portion of the anvil roll and the larger raised bonding element of the anvil roll, the longer and more gradual the slope and curvature of the transition gradient need be.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A ramped anvil roll for cooperating with an ultrasonic horn and thereby creating ultrasonic bonds in a work piece passing between said anvil roll and a respective such ultrasonic horn, first and second sides of said anvil roll defining an anvil roll width therebetween, said anvil roll further comprising a circumference thereabout, a relatively smaller radius portion of said anvil roll extending about a first portion of the circumference, and a relatively larger-radius raised bonding element extending about a second portion of the circumference, said raised bonding element having a front end portion, a rear end portion, a width defined by first and second sides thereof, and a raised operating surface defined between the first and second sides of said raised bonding element, and between the front end portion and the rear end portion, an outer surface at at least one of the front end portion and the rear end portion of said raised bonding element defining a transition gradient between the raised operating surface and the relatively smaller radius portion of said anvil roll, said transition gradient defining a modified sinusoidally-shaped curved transitional loading surface including an inflection locus, said curved loading surface representing a relatively constantly changing angle as measured against respective radii of said anvil roll in combination with advancing along the corresponding portion of the circumference of said anvil roll.

2. A ramped ultrasonic anvil roll as in claim 1 wherein said transition gradient corresponds with about 0.30 inch to about 0.70 inch of the circumference of said anvil.

3. A ramped ultrasonic anvil roll as in claim 1, said anvil roll having a width of about 0.60 inch to about 6.00 inches.

4. A ramped ultrasonic anvil roll as in claim 1 wherein the loading surface of said raised bonding element of said anvil roll comprises an array of projections thereon spaced from each other and extending along the respective second portion of the circumference of said anvil roll, and across the entirety of the transverse width of said raised bonding element, thereby covering substantially the entirety of said loading surface of said raised bonding element of said anvil roll.

5. A ramped ultrasonic anvil roll as in claim 1 wherein the raised operating surface of said raised bonding element of said anvil roll comprises an array of projections thereon spaced from each other and extending along the respective second portion of the circumference of said anvil roll, and across the entirety of the transverse width of said raised bonding element, thereby covering substantially the entirety of said operating surface of said raised bonding element of said anvil roll.

6. A ramped ultrasonic anvil roll as in claim 1 wherein the loading surface and the raised operating surface of said raised bonding element of said anvil roll comprise an array of projections thereon spaced from each other and extending along the respective second portion of the circumference of said anvil roll, and across the entirety of the transverse width of said at least one raised bonding element, thereby covering substantially the entirety of said loading surface and said operating surface of said raised bonding element of said anvil roll.

7. A ramped ultrasonic anvil roll as in claim 1 wherein the loading surface of said raised bonding element of said anvil roll comprises an array of projections thereon, said projections being disposed in discrete spaced arrays which cover portions but not all of either or both of the circumference or width attributes of the loading surface of said raised bonding element of said anvil roll.

8. A ramped ultrasonic anvil roll as in claim 1 wherein the raised operating surface of said raised bonding element of said anvil roll comprises an array of projections thereon, said projections being disposed in discrete spaced arrays which cover portions but not all of either or both of the circumference or width attributes of the raised operating surface of said raised bonding element of said anvil roll.

9. A ramped ultrasonic anvil roll as in claim 1 wherein the loading surface and the raised operating surface of said raised bonding element of said anvil roll comprise an array of projections thereon, said projections being disposed in discrete spaced arrays which cover portions but not all of either or both of the circumference or width attributes of the loading surface and the raised operating surface of said raised bonding element of said anvil roll.

10. A ramped ultrasonic anvil roll as in claim 1 wherein a pattern of projections about one or both of the loading surface and the raised operating surface of said raised bonding element of said anvil roll generally defines a resultant bond pattern and wherein the resultant bond pattern represents about 20 percent to about 40percent bond area and about 80 percent to about 60 percent non-bond area.

11. A ramped ultrasonic anvil roll as in claim 1, wherein a resultant bond pattern from a first pattern of projections about the loading surface of said anvil roll represents the same or less percentage bonded area as a second pattern of projections about the raised operating surface of said anvil roll.

12. A ramped ultrasonic anvil roll as in claim 1 wherein the second radius is about 0.002 inch to about 0.07 inch greater than the first radius.

13. A ramped ultrasonic anvil roll as in claim 1, said loading surface of a given said transition gradient being shaped to facilitate vertical acceleration and vertical deceleration, of such ultrasonic horn.

14. A ramped ultrasonic anvil roll as in claim 1, said transition gradient being disposed at the front end portion of said raised bonding element of said anvil roll, a second such transition gradient being defined at the rear end portion of said raised bonding element.

15. A ramped ultrasonic anvil roll as in claim 1, said transition gradient being disposed at the front end portion of said raised bonding element of said anvil roll.

16. A ramped ultrasonic anvil roll as in claim 1, said transition gradient being disposed at the rear end portion of said raised bonding element of said anvil roll.

17. A ramped ultrasonic anvil roll as in claim 1, said loading surface of said transition gradient comprising a leading edge and a trailing edge, the leading edge being defined at a radius at least as great as the first radius and less than the second radius, the trailing edge being defined at the second radius and corresponding with the leading edge of the raised operating surface, the inflection locus being disposed between the leading and trailing edges, the loading surface being shaped to preclude effective bonding interference between said rotary anvil roll and a cooperating rotary ultrasonic horn, for bonding an absorbent article substrate, between the inflection locus and the leading edge of the raised operating surface.

18. A ramped ultrasonic anvil roll as in claim 1, said loading surface of said transition gradient comprising a leading edge and a trailing edge, the trailing edge being defined at a radius at least as great as the first radius and less than the second radius, the leading edge being defined at the second radius and corresponding with the trailing edge of the raised operating surface, the inflection locus being disposed between the leading and trailing edges, the loading surface being shaped to preclude effective bonding interference between said rotary anvil roll and a cooperating rotary ultrasonic horn, for bonding an absorbent article substrate, between the inflection locus and the trailing edge of the raised operating surface.

19. Ultrasonic bonding apparatus for intermittently creating ultrasonic bonds in sequentially advancing absorbent article work piece segments, in a nip, wherein the work piece segments are up to about 0.25 inch thick at respective bonding loci, said ultrasonic bonding apparatus comprising:

(a) a ramped anvil roll mounted for rotation about a first axis, first and second sides of said anvil roll defining an anvil roll width therebetween, said anvil roll further comprising a circumference thereabout, a relatively smaller radius portion of said anvil roll extending about a first portion of the circumference, and a relatively larger-radius raised bonding element extending about a second portion of the circumference, said raised bonding element having a front end portion, a rear end portion, a width defined by first and second sides thereof, and a raised operating surface defined between the first and second sides of said raised bonding element, and between the front end portion and the rear end portion, an outer surface at at least one of the front end portion and the rear end portion of said raised bonding element defining a transition gradient between the raised operating surface and the relatively smaller radius portion of said anvil roll, said transition gradient defining a modified sinusoidally-shaped curved loading surface including an inflection locus, said curved loading surface representing a relatively constantly changing angle as measured against respective radii of said anvil roll in combination with advancing along the corresponding portion of the circumference of said anvil roll, and (b) a rotary ultrasonic horn mounted for rotation about a second axis, generally aligned with the first axis, said horn comprising a radius, a circumference, a width, and a bonding surface, said ultrasonic horn and said anvil roll, in combination, being mounted and configured such that said ultrasonic horn and said anvil roll can be brought together to define a nip therebetween, and wherein said anvil roll and said ultrasonic horn can rotate in common with movement of absorbent article work piece elements passing through the nip, and intermittent passage of said raised bonding element through the nip, and corresponding intermittent bonding of such workpiece elements.

20. Ultrasonic bonding apparatus as in claim 19 wherein said transition gradient corresponds with about 0.30 inch to about 0.70 inch of the circumference of said anvil roll.

21. Ultrasonic bonding apparatus as in claim 19 wherein one or both of the loading surface and the raised operating surface of said raised bonding element of said anvil roll comprise an array of projections thereon spaced from each other and extending along the respective second portion of the circumference of said anvil roll, and across the entirety of the transverse width of said raised bonding element, thereby covering substantially the respective entirety of one or both of said loading surface and said operating surface of said raised bonding element of said anvil roll.

22. Ultrasonic bonding apparatus as in claim 19 wherein one or both of the loading surface and the raised operating surface of said raised bonding element of said anvil roll comprise an array of projections thereon, said projections being disposed in discrete spaced arrays which cover portions but not all of either or both of the respective circumference or width attributes of one or both of the loading surface and the operating surface of said raised bonding element of said anvil roll.

23. Ultrasonic bonding apparatus as in claim 19 wherein a pattern of projections about one or both of the loading surface and the raised operating surface of said raised bonding element of said anvil roll generally defines a resultant bond pattern and wherein the resultant bond pattern represents about 20 percent to about 40 percent bond area and about 80 percent to about 60 percent non-bond area.

24. Ultrasonic bonding apparatus as in claim 19 wherein the second radius is about 0.002 inch to about 0.07 inch greater than the first radius.

25. Ultrasonic bonding apparatus as in claim 19, said anvil roll and said horn being mounted and configured such that, when said raised bonding element of said anvil roll passes into and through the nip, the presence of said raised bonding element in the nip, in combination with interference between said raised bonding element of said anvil roll and said horn, imposes stress on both said horn and said anvil roll, thus providing suitable force at the nip to develop ultrasonic bonds in absorbent article substrate material passing through the nip, using ultrasonic energy being expressed by said horn.

26. Ultrasonic bonding apparatus as in claim 19, said anvil roll and said horn being mounted and configured such that, when said raised bonding element of said anvil roll is not disposed in the nip, said smaller radius portion of said anvil roll is disposed in the nip, and the nip force is substantially less than a force required to form ultrasonic bonds at the nip.

27. Ultrasonic bonding apparatus as in claim 19, said anvil roll and said horn being mounted and configured such that, when said raised bonding element of said anvil roll is not disposed in the nip, said smaller radius portion of said anvil roll is disposed in the nip, and the nip force is at least a minimum force required to form ultrasonic bonds at the nip, in suitable absorbent article workpieces.

28. A ramped anvil roll for cooperating with an ultrasonic horn and thereby creating ultrasonic bonds in a work piece passing between said anvil roll and a respective such ultrasonic horn, first and second sides of said anvil roll defining an anvil roll width therebetween, said anvil roll further comprising a circumference thereabout, a relatively smaller radius portion of said anvil roll extending about a first portion of the circumference, and a relatively larger-radius raised bonding element extending about a second portion of the circumference, said raised bonding element having a front end portion, a rear end portion, a width defined by first and second sides thereof, and a raised operating surface defined between the first and second sides of said raised bonding element, and between the front end portion and the rear end portion, an outer surface at at least one of the front end portion and the rear end portion of said raised bonding element defining a transition gradient between the raised operating surface and the relatively smaller radius portion of said anvil roll, said transition gradient defining a modified sinusoidally-shaped curved loading surface including an inflection locus, said curved loading surface being configured such that vertical velocity of such ultrasonic horn at a portion of said transition gradient juxtaposed adjacent said raised operating surface is substantially zero under conditions wherein target nip pressure between said anvil roll and such rotary ultrasonic horn at said raised operating surface is effective to develop ultrasonic bonds in an absorbent article substrate.

29. A ramped ultrasonic anvil roll as in claim 28 wherein the raised operating surface of said raised bonding element of said anvil roll comprises an array of projections thereon spaced from each other and extending along the respective second portion of the circumference of said anvil roll, and across the entirety of the transverse width of said raised bonding element, thereby covering substantially the entirety of said raised operating surface of said raised bonding element of said anvil roll.

30. A ramped ultrasonic anvil roll as in claim 28 wherein the raised operating surface of said raised bonding element of said anvil roll comprises an array of projections thereon, said projections being disposed in discrete spaced arrays which cover portions but not all of either or both of the circumference or width attributes of the operating surface of said raised bonding element of said anvil roll.

31. A ramped ultrasonic anvil roll as in claim 30 further comprising a surface defined between the first and second sides of said anvil roll, and around said relatively smaller radius portion of said anvil roll, wherein at least a portion of said surface of said anvil roll comprises an array of bonding projections thereon spaced from each other and extending along at least a portion of the relatively smaller radius portion of the circumference of said anvil roll, and across at least a portion of the transverse width of said anvil roll.

32. A ramped anvil roll for cooperating with an ultrasonic horn and thereby creating ultrasonic bonds in a work piece passing between said anvil roll and a respective such ultrasonic horn, said anvil roll comprising a circumference thereabout, a relatively smaller radius portion of said anvil roll extending about a first portion of the circumference, and a relatively larger-radius raised element extending about a second portion of the circumference, said raised element having a front end portion, a rear end portion, a width defined by first and second sides thereof, and a raised operating surface defined between the first and second sides of said raised bonding element, and between the front end portion and the rear end portion, an outer surface at at least one of the front end portion and the rear end portion of said raised bonding element defining a transition gradient between the raised operating surface and the relatively smaller radius portion of said anvil roll, said transition gradient defining a modified sinusoidally-shaped curved transitional loading surface including an inflection locus, a portion of the curved loading surface which is between the inflection locus and the smaller radius portion being defined about one or more centers located outwardly of said anvil roll, and a portion of the curved loading surface which is between the inflection locus and the larger-radius raised element being defined about one or more centers located inwardly toward an interior portion of said anvil roll.

33. A ramped ultrasonic anvil roll as in claim 32, said loading surface of a given said transition gradient being shaped to facilitate vertical acceleration and vertical deceleration of such ultrasonic horn.

34. A ramped ultrasonic anvil roll as in claim 32, said transition gradient being disposed at the front end portion of said raised bonding element of said anvil roll, a second such transition gradient being defined at the rear end portion of said raised bonding element.

35. A ramped ultrasonic anvil roll as in claim 32, said transition gradient being disposed at the front end portion of said raised bonding element of said anvil roll.

36. A ramped ultrasonic anvil roll as in claim 32, said loading surface of said transition gradient comprising a leading edge and a trailing edge, the leading edge being defined at a radius at least as great as the first radius and less than the second radius, the trailing edge being defined at the second radius and corresponding with the leading edge of the raised operating surface, the inflection locus being disposed between the leading and trailing edges, the loading surface being shaped to preclude effective bonding interference between said rotary anvil roll and a cooperating rotary ultrasonic horn, for bonding an absorbent article substrate, between the inflection locus and the leading edge of the raised operating surface.

* * * * *